June 26, 1923.
G. H. ROOSEVELT
1,460,213
SYSTEM OF ELECTRICAL DISTRIBUTION
Filed April 8, 1922
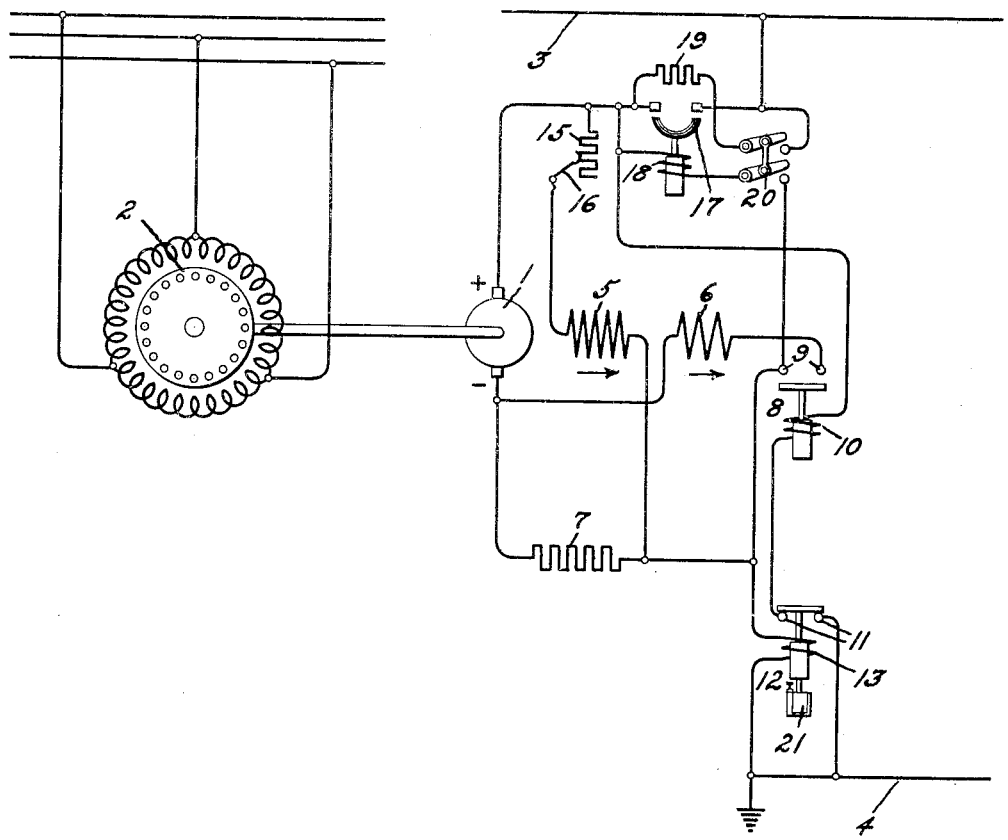
Inventor:
Gracie Hall Roosevelt,
by Albert G. Davis
His Attorney.

Patented June 26, 1923.

1,460,213

UNITED STATES PATENT OFFICE.

GRACIE HALL ROOSEVELT, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

Application filed April 8, 1922. Serial No. 550,913.

*To all whom it may concern:*

Be it known that I, GRACIE HALL ROOSEVELT, a citizen of the United States, residing at Schenectady, in the county of Schenectady, State of New York, have invented certain new and useful Improvements in Systems of Electrical Distribution, of which the following is a specification.

My invention relates to systems of electrical distribution and particularly to means for limiting the amount of power supplied to such a system under abnormal load conditions.

An object of my invention is to provide a simple, reliable and improved control arrangement for controlling the output of a dynamo electric machine under abnormal load conditions which is especially adapted for use in automatic substations where it is desirable that the machine remain permanently connected to the load circuit under all load conditions.

A further object of my invention is to provide an improved control arrangement for limiting the output of a dynamo electric machine whereby the necessary protection against short circuits and other abnormal load conditions is obtained without the use of a plurality of high speed circuit breakers and other expensive apparatus.

A further object of my invention is to provide an improved control arrangement which enables the voltage of the machine to be controlled to maintain any desired voltage characteristic as long as the output of the machine is below a predetermined value and which acts to reduce and control automatically the shunt excitation of the machine when the load resistance decreases below a predetermined value whereby the power supplied to the load circuit does not exceed the capacity of the machine and whereby the shunt field excitation is restored to its normal value automatically as soon as the load resistance again increases above a predetermined value.

My invention will be better understood from the following description taken in connection with the accompanying drawing, and its scope will be pointed out in the appended claims.

Referring to the accompanying drawing, which diagrammatically represents one embodiment of my invention, 1 represents a direct current generator, which is arranged to be driven at a substantially constant speed by any suitable means which I have represented in the drawing as an induction motor 2, and which is arranged to supply current to a load circuit represented by the mains 3 and 4. As shown in the drawing the positive terminal of the generator is connected to the main 3 and the negative terminal is connected to the main 4 which is grounded. The generator 1 is provided with a shunt field winding 5 and a series compound winding 6. Preferably, the series winding 6 is arranged to be connected in parallel with a resistor 7, when the load connected to the mains 3 and 4 is below a predetermined value so that the series winding forms a low resistance path around the resistor 7. In order to open the circuit of the series field winding so as to render the resistor 7 effective to reduce the current supplied to the load circuit, under abnormal conditions, a relay 8 is provided. This relay comprises the contacts 9 which are preferably connected in series with the series field winding 6 and a winding 10 which is arranged to be connected to the terminals of the generator through contacts 11 of an overload relay 12, the operating coil 13 of which is connected in series with the load circuit. As shown, the coil 10 is connected between the positive brush of the generator and the negative main 4. The coil 10 of the relay 8 is arranged so that when the voltage impressed thereon is above a predetermined value the contacts 9 are closed and the multiple circuit through the series field winding 6 is completed. The overload relay 12 is so designed that it does not open its contacts 11 until the current supplied to the load circuit exceeds a predetermined value.

As is well known in the art, it is preferable to connect the resistor 7 between the negative terminal of the generator and the negative side of the load circuit, which in the drawing is the main 4, in order to protect the machine against flashover between a positive brush and the frame of the machine when the frame and the negative side of the line are grounded. It is to be understood, however, that my invention is not limited to this connection as it is obvious to one skilled in the art that the resistor could be connected between the positive brush and the positive main 3. With the resistor connected in the manner shown I connect one terminal of the shunt field winding 5 to the positive brush of the generator and the other terminal to a point between the resistor 7 and the negative main 4 so that the voltage impressed upon the winding 5 is the voltage across the load circuit when it is connected to the generator.

Any well known means may be provided for varying the strength of the shunt field winding 5, this means being represented in the drawing as a rheostat comprising the resistance 15 and the movable arm 16.

Any suitable means may be provided for connecting the generator 1 to the mains 3 and 4, this means being represented in the drawing as a circuit breaker 17 which is provided with a closing coil 18 arranged to be connected to the generator 1 in any suitable manner so that the voltage impressed thereon varies with the voltage of the generator. As shown in the drawing the coil 18 is connected between the positive brush of the generator and the negative main 4. This closing coil is arranged to maintain the circuit breaker in its closed position as long as the voltage impressed across its terminals is above a predetermined value. Preferably, a small impedance, such as a resistor 19, is arranged to be connected across the terminals of the circuit breaker when the breaker is open. The circuits through the resistor 19 and the closing coil 18 may be arranged to be opened and closed by any suitable means, and in the drawing I have shown a manually controlled double-pole switch for this purpose.

The operation of my invention is as follows:—Let it be assumed that the motor 2 is started and is brought up to its normal operating speed in any well-known manner and that the switch 20 is then closed. As the motor comes up to its normal operating speed the voltage of the generator builds up and when it reaches a predetermined value relay 8 closes its contacts 9 thereby completing the circuit through the series field winding 6 which is in parallel with the resistor 7. When switch 20 is closed, closing coil 18 is energized and closes the circuit breaker 17 so that the generator is connected directly to the load circuit.

So long as the load conditions on the generator are normal no change occurs in the above mentioned connections of the generator. The voltage may be controlled by means of the adjustable resistor 15 in the circuit of the shunt field winding 5.

When the load current exceeds a predetermined value overload relay 12 opens its contacts 11 thereby deenergizing the coil 10 of the relay 8. Relay 8 then opens the circuit through its contacts 9 thereby opening the shunt circuit around the resistor 7 so that the current supplied to the load circuit decreases instantly to a value determined by the sum of the external load resistance and the resistor 7. As the current through the series resistor 7 increases the voltage across the shunt field winding 5 decreses so that the generator voltage is varied in accordance with its excitation curve until a balanced point is reached which depends upon the relative resistance values of the resistor 7 and the load resistance.

It is evident that with a short circuit connected to the load circuit near the generator the load resistance would be zero. Consequently, the voltage across the shunt field winding would also be zero and only a very small circulating current, due to the voltage produced by the residual magnetism, would flow through the resistor 7. Since this current would be supplied at a negligible potential, the load on the prime mover, here shown as an induction motor, would also be negligible. For values of load resistance greater than zero, the voltage across the shunt field and consequently the shunt field excitation and the generator voltage are greater. Preferably the resistor 7 and the relay 8 are designed so that the voltage of the generator becomes great enough to operate the relay 8 when the load resistance becomes equal to or greater than the normal full load value so that the machine is not overloaded when the shunt excitation is restored to its normal operating value.

Since the current supplied to the load circuit is reduced after the overload relay opens its contacts and remains below the normal full load value so long as the load conditions are abnormal, overload relay 12 closes its contacts 11 when the load current decreases below a predetermined value. The closing of the contacts 11 completes the circuit of the winding 10 of the relay 8, but, as above stated, this relay is so designed that it does not close its contacts until the voltage of the generator is above a predetermined value.

In order to allow sufficient time for the generator 1 to adjust its voltage in accordance with the load conditions it may be desirable to provide any suitable means such as a dash-pot 21, which is arranged to delay the closing of the contacts 11 of the relay 12 after the relay has operated in response to an overload so that the relay 8 can not close its contacts 9 until a predetermined time after the overload occurs. Any other suitable means, however, may be used to accomplish this result.

As soon as the load conditions are normal, the voltage of the generator becomes great enough to operate the relay 8 which closes its contacts 9 thereby completing the shunt circuit including the contacts 9 and the series winding 6 around the resistor 7.

Substantially full generator voltage is then impressed upon the shunt field winding 5 so that the shunt field excitation and the generator voltage are restored to their normal operating values.

In most installations, as in the embodiment shown in the drawing, and especially in automatic substations the connection between the generator and the load circuit is maintained by the energization of a holding or low voltage coil of the circuit breaker. With such an arrangement the circuit breaker would open when a short circuit occurred near enough to the generator to reduce the voltage across the line to a value below the hold-in value of the coil. If, in the arrangement shown in the drawing, the resistor 19 across the terminals of the circuit breaker were omitted the voltage of the generator would build up immediately after the breaker had opened in response to a short circuit since the overload would be disconnected from the generator, the circuit breaker would then close and full voltage would be impressed upon the short circuit whereupon the voltage of the generator would again be reduced and the circuit breaker 17 opened. This cycle of operation would continue as long as the short circuit remained connected to the load circuit. In order to prevent the opening and closing of the circuit breaker under these conditions I connect the resistor 19 across the circuit breaker terminals. The resistance value of this resistor is very small with respect to the resistor 7 so that it does not materially affect the total value of the load resistance. Consequently, the voltage of the generator remains below its normal voltage as long as the short circuit remains connected to the load circuit, even though the circuit breaker 17 is open. Preferably, the coil 18 is so designed that it will operate in response to a lower voltage than that required to operate the relay 8 so that the resistor 19 is short circuited before relay 8 closes its contacts 9.

From the above description, it is evident that my improved control arrangement does away with the need of any complicated control arrangement and also prevents any appreciable amount of current being supplied to a short circuit or other overload, thereby preventing the generator from being damaged.

While I have shown and described one embodiment of my invention, I do not desire to be limited to this specific arrangement, but seek to cover in the appended claims all those modifications which fall within the true spirit and scope of my invention.

What I claim as new and desire to secure by Letters Patent of the United States, is:—

1. In a system of electrical distribution, the combination of a direct current generator having an armature winding, a load circuit arranged to be supplied with current from said generator, a resistance arranged to be connected in series with the armature winding of said generator and said load circuit, means for causing current to flow through said resistance when the load connected to said load circuit exceeds a predetermined value, and a field winding for said generator connected in shunt with said armature winding and said resistance.

2. In a system of electrical distribution, the combination of a direct current generator having an armature winding, a load circuit arranged to be supplied with current from said generator, a resistance arranged to be connected in series with the armature winding of said generator and said load circuit when the load connected to said load circuit exceeds a predetermined value, means arranged to control a shunt circuit around said resistance so that said resistance is substantially short circuited when the load on said machine is below a predetermined value, and a field winding for said generator connected in shunt with said armature winding and said resistance.

3. In a system of electrical distribution, the combination of a direct current generator having an armature winding, a load circuit arranged to be supplied with current from said generator, a resistance arranged to be connected in series with the armature winding of said generator and said load circuit when the load connected to said load circuit exceeds a predetermined value, means arranged to control a shunt circuit around said resistance so that said resistance is substantially short circuited when the load on said machine is below a predetermined value, a field winding connected in said shunt circuit around said resistance, and another field winding for said generator connected in shunt with said armature winding and said resistance.

4. In a system of electrical distribution, the combination of a direct current generator having an armature winding, a load circuit arranged to be supplied with current from said generator, a resistance arranged to be connected in series with the armature winding of said generator and said load circuit when the load connected to said load circuit exceeds a predetermined value, a field winding for said generator connected in shunt with said armature winding and said resistance, electromagnetically operated means operative in response to the voltage of said generator to short circuit said resistance, and means operative in response to the load current for controlling the operation of said electromagnetically operated means.

5. In a system of electrical distribution, the combination of a direct current generator having an armature winding, a load circuit arranged to be supplied with current from said generator, a resistance arranged to be connected in series with the armature winding of said generator and said load circuit when the load connected to said load circuit exceeds a predetermined value, a field winding for said generator connected in shunt with the armature winding of said generator and said resistance, electromagnetically operated means adapted to short circuit said resistance, a circuit for said electromagnetically operated means connected to said generator, and an overload relay arranged to interrupt the circuit of said electromagnetically operated means when the load connected to said load circuit exceeds a predetermined value.

6. In a system of electrical distribution, the combination of a direct current generator having an armature winding, a load circuit arranged to be supplied with current from said generator, a resistance arranged to be connected in series with the armature winding of said generaor and said load circuit when the load connected to said load circuit exceeds a predetermined value, a field winding for said generator connected in shunt with the armature winding of said generator and said resistance, electromagnetically operated means adapted to complete a low resistance circuit around said impedance when the voltage of said generator is above a predetermined value, a circuit for said electromagnetically operated means, a second field winding for said machine connected in said low resistance circuit around said resistance, and an overload relay arranged to interrupt the circuit of said electromagnetically operated means when the load connected to said load circuit exceeds a predetermined value.

7. In a system of electrical distribution, the combination of a direct current generator having an armature winding, a load circuit arranged to be supplied with current from said generator, a resistance arranged to be connected in series with the armature winding of said generator and said load circuit when the load connected to said load circuit exceeds a predetermined value, a field winding for said generator connected in shunt with said armature winding and said resistance, a circuit breaker arranged to connect said generator to said load circuit, a second resistance having a small value compared to said first mentioned resistance arranged to be connected in series with said load circuit and the armature winding of said machine when said circuit breaker is open, and means operative in response to the voltage of said machine to open and close said circuit breaker.

8. A system of electrical distribution comprising a load circuit, a dynamo electric machine arranged to supply current to said load circuit, means arranged to effect a material reduction in the voltage of said machine when the load connected thereto exceeds a predetermined value, a circuit breaker arranged to connect said machine to said load circuit, means responsive to the voltage of said machine for controlling the opening and closing of said circuit breaker, and a low impedance arranged to be connected in series with said load circuit and said machine when said circuit breaker is open.

In witness whereof, I have hereunto set my hand this 7th day of April, 1922.

GRACIE HALL ROOSEVELT.